United States Patent
Zhao et al.

(10) Patent No.: US 9,757,986 B2
(45) Date of Patent: *Sep. 12, 2017

(54) TIRE HAVING TREAD WITH TREAD GROOVE-CONTAINING RUBBER BLOCK JOINING THE TIRE CARCASS AND EXTENDING THROUGH A TREAD BASE INTO A TREAD CAP

(71) Applicant: The Goodyear Tire & Rubber Company, Akron, OH (US)

(72) Inventors: Junling Zhao, Hudson, OH (US); Roberto Cerrato Meza, North Canton, OH (US); Paulo Roberto Goncalves, Americana (BR); Leandro Forciniti, Canton, OH (US); Warren James Busch, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 763 days.

This patent is subject to a terminal disclaimer.

(21) Appl. No.: 14/134,250

(22) Filed: Dec. 19, 2013

(65) Prior Publication Data

US 2015/0174964 A1    Jun. 25, 2015

(51) Int. Cl.
*B60C 11/00*    (2006.01)
*B60C 1/00*    (2006.01)

(52) U.S. Cl.
CPC .......... *B60C 11/005* (2013.01); *B60C 1/0016* (2013.01); *B60C 11/0075* (2013.01)

(58) Field of Classification Search
CPC ............... B60C 11/005; B60C 11/0058; B60C 11/0066; B60C 11/0075; B60C 11/1346
USPC ........................................................ 152/209.5
See application file for complete search history.

(56) References Cited

U.S. PATENT DOCUMENTS

| | | | |
|---|---|---|---|
| 4,663,405 A | 5/1987 | Throckmorton | 526/144 |
| 5,176,765 A | 1/1993 | Yamaguchi et al. | 152/209 R |
| 5,451,646 A | 9/1995 | Castner | 526/137 |
| 5,513,683 A * | 5/1996 | Causa | B60C 1/00 152/209.4 |
| 5,718,782 A | 2/1998 | Fourgon | 152/209 R |
| 5,772,807 A | 6/1998 | Fourgon | 152/209 R |
| 5,843,249 A | 12/1998 | Ryba et al. | 152/209 R |
| 6,213,181 B1 | 4/2001 | Janajreh | 152/209.5 |
| 2002/0174924 A1 | 11/2002 | Zanzig et al. | |

(Continued)

FOREIGN PATENT DOCUMENTS

| | | | |
|---|---|---|---|
| JP | 53-080602 | * | 7/1978 |
| JP | 09-071112 | * | 3/1997 |

(Continued)

OTHER PUBLICATIONS

EPO Search Report dated Jun. 24, 2015.

*Primary Examiner* — Robert Dye
(74) *Attorney, Agent, or Firm* — Henry C. Young, Jr.

(57) ABSTRACT

The invention relates to pneumatic tires having treads of a cap/base configuration where the outer tread cap rubber layer contains lugs with intervening grooves which extend to the running surface of the tread cap and wherein at least one of said grooves is contained in a rubber block within the tread. For this invention, the tread groove-containing rubber block joins the tire carcass and extends radially outward through the tread base rubber layer and into the outer tread cap rubber layer.

7 Claims, 2 Drawing Sheets

(56) References Cited

U.S. PATENT DOCUMENTS

| | | | | |
|---|---|---|---|---|
| 2004/0050469 A1* | 3/2004 | Sandstrom | ............ | B60C 1/0016 |
| | | | | 152/209.5 |
| 2007/0039672 A1* | 2/2007 | Lo | ......................... | B60C 19/082 |
| | | | | 152/152.1 |
| 2007/0187013 A1* | 8/2007 | Losi | .................... | B60C 11/0306 |
| | | | | 152/209.5 |
| 2007/0221304 A1* | 9/2007 | Boiocchi | ................. | B60C 11/00 |
| | | | | 152/451 |
| 2010/0154948 A1 | 6/2010 | Dahlberg et al. | .......... | 152/209.4 |
| 2012/0053286 A1* | 3/2012 | Zhao | .................... | B60C 1/0016 |
| | | | | 524/517 |
| 2012/0305153 A1* | 12/2012 | Zhao | .................... | B60C 1/0016 |
| | | | | 152/209.1 |

FOREIGN PATENT DOCUMENTS

| | | | |
|---|---|---|---|
| JP | 2000-118212 | * | 4/2000 |
| JP | 2001047815 | | 2/2001 |
| JP | 2001-206013 | * | 7/2001 |
| WO | 2005063508 A1 | | 7/2005 |
| WO | WO2013/087882 | * | 6/2013 |

* cited by examiner

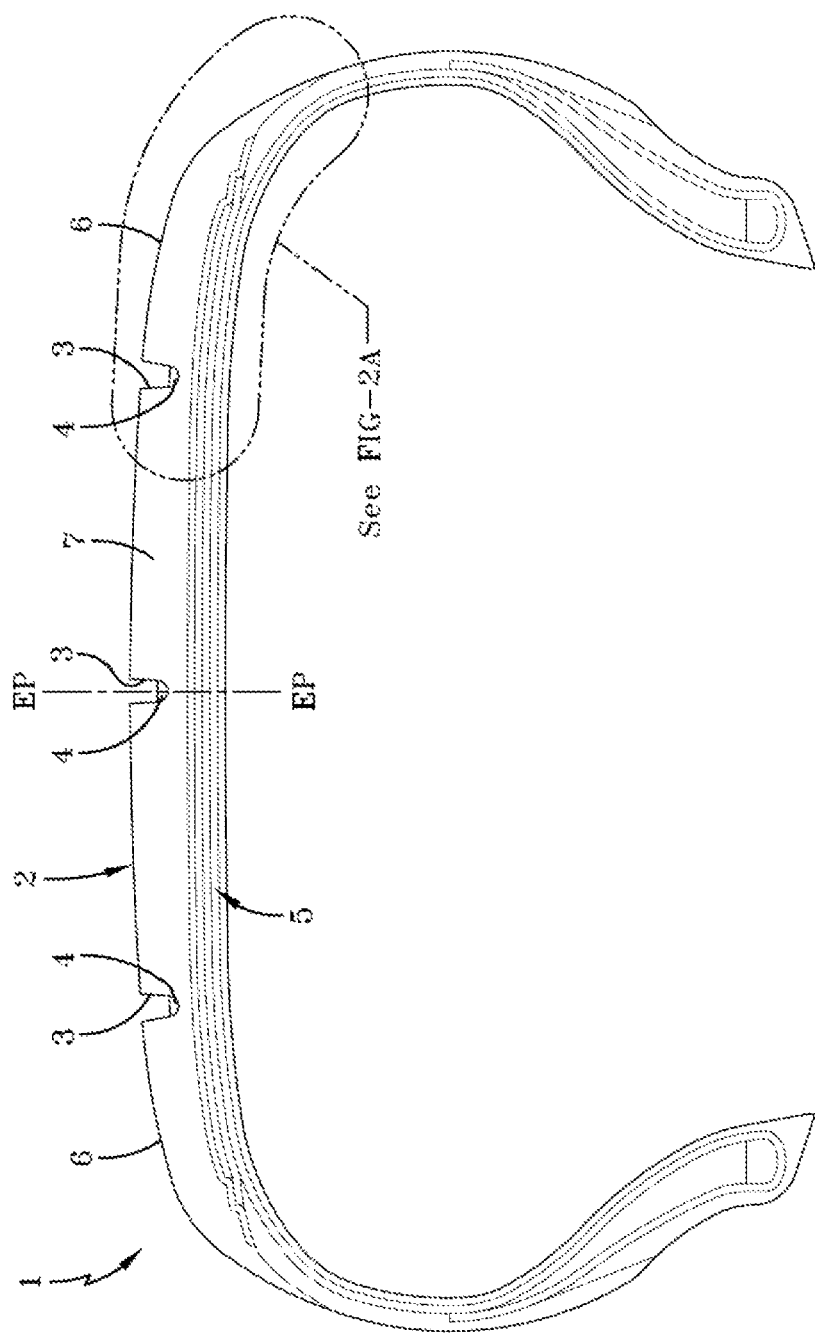

TIRE HAVING TREAD WITH TREAD GROOVE-CONTAINING RUBBER BLOCK JOINING THE TIRE CARCASS AND EXTENDING THROUGH A TREAD BASE INTO A TREAD CAP

FIELD OF THE INVENTION

The invention relates to a pneumatic truck tire, particularly a bus tire, with a tread of a cap/base configuration comprised of a circumferential outer tread cap rubber layer and an underlying tread base rubber layer and supporting tire carcass. The outer tread cap rubber layer is configured with lugs, particularly circumferential ribs with circumferential grooves between the ribs. A tread groove-containing rubber block as a tire component joins a tire carcass and extends from the tire carcass radially outward through the tread base rubber layer and into the outer tread cap rubber layer.

BACKGROUND OF THE INVENTION

This invention relates to a tire, particularly a truck tire, and particularly a bus tire, intended to be used to support and carry relatively large vehicular loads over roads, which may contain irregular road surfaces. The lugs of the tire tread may be in a form of circumferential rubs. Rib treaded tires have been referred to, for example, and not intended to be limiting, in U.S. Pat. Nos. 5,718,782, 5,772,807 and 5,843,249.

It is desired that the outer tread cap rubber layer of the tread, which contains the tread's running surface, is a rubber composition intended to promote durability of the tread, particularly for use on irregular road surfaces.

In one embodiment, the tread cap rubber composition is a natural rubber-rich rubber composition where a major portion of its elastomer is comprised of natural cis 1,4-polyisoprene rubber and a minor portion comprised of at least one of polybutadiene (e.g. c is 1,4-polybutadiene) and styrene/butadiene elastomers.

In another embodiment, the tread cap rubber composition is a polybutadiene rubber-rich (e.g. cis 1,4-polybutadiene-rich) rubber composition with a major portion of its elastomer is comprised of the polybutadiene rubber and a minor portion comprised of at least one of cis 1,4-polyisoprene and styrene/butadiene elastomers.

Where lower rolling resistance is desired for such truck, or bus, tire to promote vehicular fuel economy, the outer tread cap rubber layer may contain reinforcing filler composed of a combination of rubber reinforcing carbon black and precipitated silica where a significant portion of the reinforcing filler is precipitated silica. If the precipitated silica exceeds the rubber reinforcing carbon black in the outer tread rubber composition, the rubber composition might be referred to as being a silica-rich rubber.

During service of the tire, particularly over irregular road surfaces, the tread lugs, particularly circumferential tread ribs, may experience significant physical stress which may sometimes promote a degree of small surface crack formation on the tread groove surfaces between the tread lugs, or circumferential tread ribs, particularly in the bottom portion of the tread grooves.

Historically, surfaces of tread grooves have sometimes been protected, when appropriate and if desired, by providing an external thin protective rubber layer over the surface, or surfaces, of the grooves. Further, in one aspect, tread grooves have sometimes been reinforced with stiffer rubber than the tread itself to promote handling of the tire. For an example, which is not intended to be limiting, see U.S. Pat. Nos. 6,213,181 and 5,176,765 and U.S. Patent Application Publication No. 2010/0154948.

However, as a departure from such past practice, it is proposed to provide a rubber block, or encasement, within the tire tread for containing at least a portion of at least one of the tread grooves instead of being a simple rubber coating on the groove surface where a rubber block extends from the tire's carcass through the tread's base rubber layer into the tread's outer cap rubber layer to thereby encompass at least a portion of a tread groove. In this manner, then, for a circumferential groove, the rubber block itself would also be circumferential in a sense of extending circumferentially around the tire within the tire tread. The groove containing encasement, or rubber block, would thereby become at least a portion, or part, of the surface of the tread groove itself.

In one embodiment, the rubber encasement, namely the rubber block forming the encasement, joins and extends from the tire carcass axially outward through the tread base layer through the outer tread cap rubber layer to and including the outer running surface of the tire tread (tread cap layer). Therefore the encasement, or rubber block, is not simply a thin rubber coating over a surface of the tread groove, but instead is a part of the tread groove itself.

In another embodiment, the rubber encasement, namely the rubber block forming the encasement, extends from tire carcass axially outward through the tread base layer into the outer tread cap rubber layer without extending to the tread running surface.

As indicated, the groove containing rubber block (rubber encasement) is a part of at least a portion of a tread groove and desirably includes the bottom of the tread groove.

The rubber composition of the groove containing rubber block (encasement) beneficially promotes at least one physical property such as greater tear resistance, greater cut growth resistance and increased elongation at break to the surface of the tread groove embedded in the rubber encasement, or rubber block, compared to the adjoining outer tread cap rubber composition which contains the rubber block. The rubber composition of the tread groove containing rubber block may also beneficially promote increased fatigue resistance of the surface of the embedded tread groove as compared to the adjoining outer tread cap rubber composition.

In one embodiment, rubber composition of the tread cap rubber layer may contain silica-rich reinforcing filler comprised of a combination of rubber reinforcing carbon black and precipitated silica of which the precipitated silica is the majority of the rubber reinforcing filler. The precipitated silica is used together with silica coupling agent In one embodiment, the rubber reinforcing carbon black content of the tread cap rubber composition may be less than 30 parts by weight per 100 parts of elastomer (phr) which, in turn, can promote a significant reduction of its electrical conductivity (can promote an increase its electrical resistivity).

In one embodiment, the tread base rubber composition contains carbon black-rich filler reinforcement of which the rubber reinforcing carbon black is the majority of the rubber reinforcing filler. Therefore the rubber reinforcing carbon black is the majority of the reinforcing filler, usually in a quantity of at least 50 phr thereof. When the rubber reinforcing carbon black content in the rubber composition is at least 40 phr is expected to promote electrical conductivity (promote a reduction in electrical resistivity).

The rubber composition of the rubber encasement, or tread groove-containing rubber block extending from the tire carcass may be of the same or different rubber composition as the portion of tire carcass from which its extends and the same or different from the tread base rubber layer through which it passes.

When the tread groove containing rubber block contains at least about 40 phr of rubber reinforcing carbon black which extends from the tread carcass rubber which contains at least 40 phr of rubber reinforcing carbon black extends to an outer tread rubber cap which contains less than 35, alternately less than 20, phr of rubber reinforcing carbon black a path of least electrical resistance (path of electrical conductivity) can thereby be provided between the tread carcass and outer tread running surface of the tread cap rubber layer by the groove containing rubber block.

In the description of this invention, terms such as "compounded rubber", "rubber compound" and "compound", if used herein, refer to rubber compositions containing of at least one elastomer blended with various ingredients, including curatives such as sulfur and cure accelerators. The terms "elastomer" and "rubber" may be used herein interchangeably unless otherwise indicated. It is believed that such terms are well known to those having skill in such art.

DISCLOSURE AND PRACTICE OF THE INVENTION

In accordance with this invention, a pneumatic rubber tire is provided having a circumferential tread of a cap/base construction comprised of an outer tread cap rubber layer containing a plurality of lugs in a form of circumferential ribs with intervening grooves between the ribs together with an underlying a tread base rubber layer which underlies the outer tread cap rubber layer and a supporting tire rubber carcass for the tread;

wherein said tire tread further includes at least one circumferential tread rubber block, or encasement, which contains at least a portion of at least one of said tread grooves including the bottom of at least one of said groove(s);

wherein said tire groove containing rubber block joins the tire carcass and extends radially outward through the tread base rubber layer into the outer tread cap rubber layer, and contains at least a portion of at least one of said tread grooves, including a bottom of at least one of said grooves.

In one embodiment, said tire groove-containing rubber block is a portion of the surface of at one of said tread grooves.

In one embodiment, a tread groove extends through the outer tread cap rubber layer and into the underlying tread base rubber layer.

In one embodiment, a tread groove in the outer tread cap rubber layer does not extend to the underlying tread base rubber layer.

In selective embodiments, the said tire groove-containing rubber block:

(A) extends radially outward from said tire carcass through said tread base rubber layer into said outer tread cap rubber to include a portion of the outer tread running surface of at least one rib of said tread cap rubber layer, or (B) extends radially outward from said tire carcass trough said tread base rubber layer into said outer tread cap rubber without extending to a running surface of the tire (whereas, in such embodiment, the rubber block may include the bottom of said groove and up to about 50 percent of the height of said groove from its bottom).

The rubber compositions of the tread cap rubber layer, underlying tread base rubber layer, tire carcass from which the tire groove containing rubber block extends and groove containing rubber block are comprised of sulfur cured diene elastomer-containing rubber compositions.

In one embodiment, said tread cap rubber layer is comprised of a precipitated silica rich rubber composition which contains less than 35, alternately less than 30, phr of rubber reinforcing carbon black reinforcing filler and said tread base rubber layer and said rubber block joining and extending from said tread rubber base layer are the same or different carbon black rich rubber compositions which contain at least about 40, alternately at least about 50 phr of rubber reinforcing carbon black reinforcing filler.

In one embodiment, the rubber composition of the tread rubber block has a cut growth rate property of at least 24 millimeters/minute less than the cut growth rate property of the rubber composition of the tread cap rubber layer according to ASTM test D813 at 23° C.

In one embodiment the rubber composition of said tread cap rubber layer is comprised of, based on parts by weight per 100 parts by weight rubber (phr):

(A) about 51 to about 90, alternatively about 70 to about 90, phr of diene based elastomers comprised of cis 1,4-polyisoprene rubber (desirably natural cis 1,4-polyisoprene rubber), and about 10 to about 49, alternately from about 10 to about 30, phr of at least one of cis 1,4-polybutadiene rubber and styrene/butadiene rubber, or (B) from 51 to about 90, alternatively about 70 to about 90, phr of diene based elastomers comprised of cis 1,4-polybutadiene rubber, and about 10 to about 49, alternately from about 10 to about 30, phr of cis 1,4-polyisoprene rubber (desirably natural cis 1,4-polyisoprene rubber), where the rubber composition of said tread cap rubber layer contains about 40 to about 120 phr of rubber reinforcing filler comprised of:

(1) rubber reinforcing carbon black, or (2) precipitated silica (amorphous synthetic silica), which may containing a minimal amount of carbon black (e.g. up to 10 phr of carbon black)

(3) combination of rubber reinforcing carbon black and precipitated silica (amorphous synthetic silica), (in one embodiment said rubber reinforcing filler may contain from about 5 to about 40, alternately about 5 to about 30, phr of rubber reinforcing carbon black);

together with a silica coupler for said precipitated silica having a moiety reactive with hydroxyl groups on said precipitated silica and another different moiety interactive with said diene based elastomers, wherein the rubber composition of said tread base rubber layer and said tread groove containing rubber block contain the same or different elastomers as the tread cap rubber composition and are individually comprised of:

(C) about 51 to about 90, alternatively about 70 to about 90, phr of cis 1,4-polyisoprene rubber (desirably natural cis 1,4-polyisoprene rubber), and about 10 to about 49, alternately from about 10 to about 30, phr of at least one of cis 1,4-polybutadiene rubber and styrene/butadiene rubber, or (D) from 51 to about 90, alternatively about 70 to about 90, phr diene based elastomers comprised of cis 1,4-polybutadiene rubber, and about 10 to about 49, alternately from about 10 to about 30, phr of cis 1,4-polyisoprene rubber (desirably natural cis 1,4-polyisoprene rubber), or (E) from about 40 to about 60 phr of diene based elastomers comprised of cis 1,4-polyisoprene rubber and, correspondingly from about 60 to about 40 phr of at least one of cis 1,4-polybutadiene rubber and styrene/butadiene rubber, where the rubber composition of said tread base rubber layer and said tread groove containing rubber block individually contain about 40 to about 100 phr of rubber reinforcing filler comprised of:
(1) rubber reinforcing carbon black, or
(2) combination of rubber reinforcing carbon black and precipitated silica (amorphous synthetic silica) (for example, the said rubber reinforcing filler may contain from about 40 to about 80, alternately about 55 to about 60, phr of rubber reinforcing carbon black;
together with a silica coupler for said precipitated silica having a moiety reactive with hydroxyl groups on said precipitated silica and another different moiety interactive with said diene based elastomers, In one embodiment, the cis 1,4-polybutadiene rubber is:

(A) a first cis 1,4-polybutadiene rubber having a microstructure comprised of from about 90 to about 99 percent cis 1,4-isomeric units, a number average molecular weight (Mn) in a range of from about 120,000 to about 300,000 and a heterogeneity index (Mw/Mn) in a range of from about 2.1/1 to about 4.5/1 (a relatively high heterogeneity index range illustrating a significant disparity between its number average and weight average molecular weights), or (B) a second cis 1,4-polybutadiene rubber having a microstructure comprised of from about 96 to about 99 percent cis 1,4-isomeric units, a number average molecular weight (Mn) in a range of from about 150,000 to about 300,000 and a heterogeneity index (Mw/Mn) in a range of from about 1.5/1 to about 2/1 (a relatively moderate heterogeneity index range illustrating a moderate disparity between its number average and weight average molecular weights).

Said first cis 1,4-polybutadiene rubber may be the product of a nickel catalyst promoted polymerization of 1,3-butadiene monomer in an organic solvent solution such as, for example polymerization of 1,3-polybutadiene monomer in an organic solvent solution in the presence of a catalyst system as described in U.S. Pat. No. 5,451,646 which is based on polymerization of 1,3-butadiene monomer with a catalyst system comprised of, for example, a combination of an organonickel compound (e.g. nickel salt of a carboxylic acid), organoaluminum compound (e.g. trialkylaluminum) and fluoride containing compound (e.g. hydrogen fluoride or complex thereof).

Said second cis 1,4-polybutadiene rubber may be the product of a neodymium catalyst promoted polymerization of 1,3-butadiene monomer in an organic solvent such as, for example, polymerization of 1,3-butadiene monomer in an organic solvent solution in the presence of a catalyst system comprised of, for example, organoaluminum compound, organometallic compound such as for example neodymium, and labile (e.g. vinyl) halide described in, for example and not intended to be limiting, U.S. Pat. No. 4,663,405.

The silica coupler has a moiety reactive with hydroxyl groups (e.g. silanol groups) on said precipitated silica and another different moiety interactive with said conjugated diene elastomers.

In one embodiment, the silica coupling agent is comprised of a bis(3-trialkoxysilylalkyl) polysulfide containing an average in a range of from about 2 to about 3.8, alternately from about 2 to about 2.6 and alternately from about 3 to about 3.8, connecting sulfur atoms in its polysulfidic bridge or an alkoxyorganomercaptosilane.

In one embodiment, said silica coupling agent is comprised of bis(3-triethoxysilylpropyl) polysulfide.

In one embodiment bis(3-triethoxypropyl) polysulfide contains an average in a range of from about 2 to about 2.6 connecting sulfur atoms in its polysulfidic bridge.

An important aspect of this invention is use of tire tread groove-containing rubber blocks to promote resistance to tread groove cracking, particularly tear resistance and cut growth resistance.

BRIEF DESCRIPTION OF DRAWINGS

Drawings presented as FIGS. 1, 2A and 2B are provided to illustrate a tire cross-section with a tread configured with lugs and grooves and composed of an outer tread cap rubber layer, an underlying tread base rubber layer and internal rubber block containing said grooves which joins the tire carcass as a tire component separate from the tire carcass itself, and which extends radially outward through a tread base rubber layer and thence into the tread cap rubber layer (FIG. 1) in which the internal rubber block extends to and becomes a part of the tread's running surface (FIG. 2A) or extends to about 50percent beyond its groove bottom (FIG. 2B).

In the Drawings

FIG. 1 illustrates a cross section of a pneumatic tire (1) composed of an outer tread cap rubber layer (2) of a rib and groove configuration, namely circumferential ribs (7) with a tread running surface (6) and intervening circumferential grooves (3), underlying tread base rubber layer (10) positioned over a tire carcass (5).

Figure 2A:
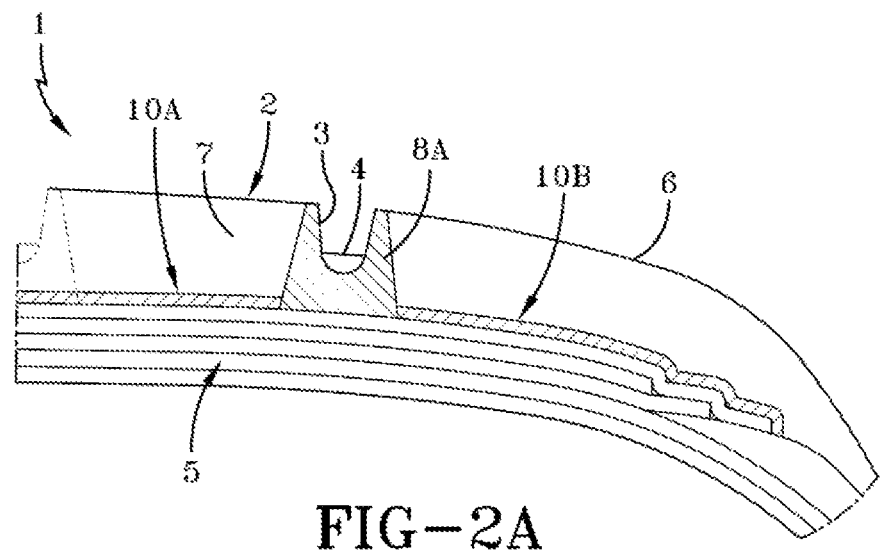
FIG. 2A illustrates a portion of the tire cross section (1) of FIG. 1 to include the outer tread cap rubber cap rubber layer (2) with circumferential ribs (7) to provide a running surface (6) for the tread and an underlying tread base rubber layer (10) with supporting tire carcass (5) and a tread groove containing rubber block, or encasement, (8A) which joins the tire carcass (5) and which extends radially outward through a divided tread base rubber layer (10A) and (10B) and thence into and through the outer tread cap rubber layer (2) to and including a part of its running surface (6), together with an optional treadwear indicator (4).
Figure 2B:
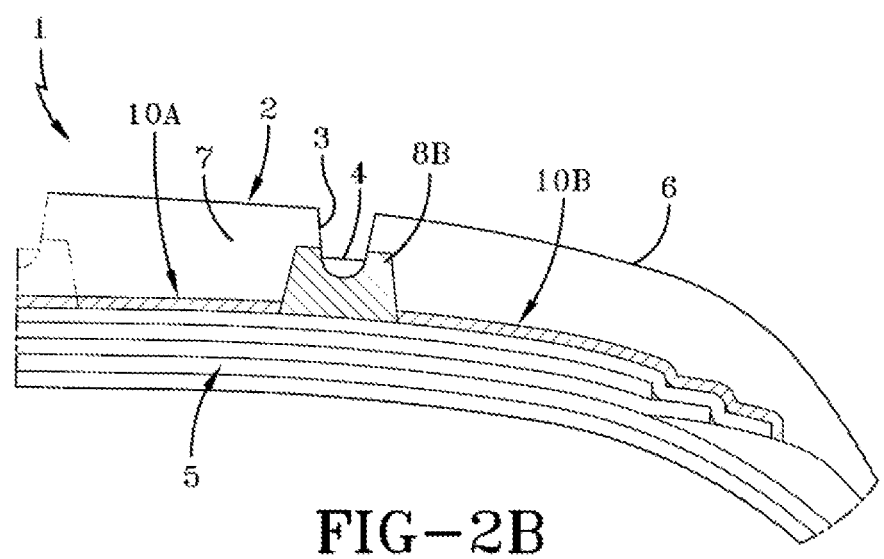
FIG. 2B illustrates a portion of the tire cross section (1) of FIG. 1 to include the outer tread cap rubber cap rubber layer (2) with circumferential ribs (7) to provide a running surface (6) for the tread and an underlying tread base rubber layer (10) with supporting tire carcass (5) and a tread groove containing rubber block, or encasement, (8B) which joins the tire carcass (5) and which extends radially outward through a divided tread base rubber layer (10A) and (10B) and thence into outer tread cap rubber layer (2) for a distance of about 50 percent of the height of the tread groove from the bottom of the groove and above its tread wear indicator (4) and which does not extend to the tread's running surface (6).

The precipitated silica for the reinforcing filler is a synthetic amorphous silica (e.g. precipitated silica) such as, for example, those obtained by the acidification of a soluble silicate (e.g., sodium silicate or a co-precipitation of a silicate and an aluminate). Such precipitated silicas are, in general, well known to those having skill in such art.

The BET surface area of the synthetic silica (precipitated silica), as measured using nitrogen gas, may, for example, be in a range of about 50 to about 300, alternatively about 120 to about 200, square meters per gram.

The silica may also have a dibutylphthalate (DBP) absorption value in a range of, for example, about 100 to about 400, and usually about 150 to about 300 cc/g.

Various commercially available synthetic silicas, particularly precipitated silicas, may be considered for use in this invention such as, for example, only and without limitation, silicas commercially available from PPG Industries under the Hi-Sil trademark with designations 210, 243, etc; silicas available from Rhodia, with designations of Zeosil 1165MPT™, Zeosil 165GR™ and Zeosil Premium™, silicas available from Evonict and from Huber as Zeopol 8745™.

The following Table A presents various desirable physical properties for the rubber composition of the tread rubber encasement component of the tread (positioned within the tread and containing a tread groove) compared to an example of as tread cap layer which contains the tread groove-containing tread encasement component) as well as a desirable difference in the indicated physical properties of the tread block and example of tread cap rubber layer with a view toward resisting cracking (e.g. surface cracking) of a tread groove, particularly at a bottom of as tread groove as the tread is flexed over time.

The values for the tread cap are presented as being exemplary properties.

The values for the basic tread groove containing rubber block are presented as being the desirable properties.

The values for the alternate tread groove containing rubber block are presented as being alternate properties.

The desirable differences between the tread groove containing rubber block and tread cap rubber layer are presented as being desirable property differences.

TABLE A

| Property | Tread Cap Example | Tread Block Basic | Tread Block Alternate | Desirable Difference Between Block & Cap |
|---|---|---|---|---|
| Energy, J (joules) at break | ≤100 | ≥150 | ≥120 | ≥20 |
| DeMattia cut growth rate, 95° C., (min/mm) | ≤20 | ≥30 | ≥20 | similar |
| Elongation at break (%) | ≤500 | ≥600 | ≥550 | ≥50 |
| Additionally desired rubber properties | | | | |
| Aged energy, J (joules) at break | ≤85 | ≥120 | ≥100 | ≥15 |
| Tear resistance, N (Newtons) | ≤150 | ≥200 | ≥160 | ≥10 |
| Aged tear resistance, N (Newtons), 95° C. | ≤95 | ≥120 | ≥100 | similar |
| Aged elongation at break (%) | ≤400 | ≥500 | ≥450 | 50 |

Comparative Shore A hardness - values can be similar

Tear Resistance may be obtained according to a tear strength (peal adhesion) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force. The greater the tear resistance value, the beneficially greater the resistance to surface cracking of the tread grove surface.

The energy (in joules) can be measured by an ATS (Automated Test System instrument by Instron Company) which is a measure of energy to achieve elongation at break. It is understood that the greater the energy value (higher value in joules of energy), represents a beneficially greater tread groove surface resistance to cracking.

DeMattia cut growth rate according to ASTM D813. It is understood that the less the cut growth rate, the beneficially greater the resistance of the tread groove to surface crack growth.

For the Aged Energy value, the cured rubber sample is aged for seven days at 70° C.

For the Aged Tear Resistance value, the cured rubber Sample is aged for seven days at 70° C.

For the Aged Elongation value, the cured rubber Sample is aged for seven days at 70° C.

From Table A, it is readily seen that it is desired for the tread groove containing block rubber composition (the cured rubber) as compared to the tread cap rubber layer composition to have a combination of at least two of the following:
(A) increased tear resistance,
(B) increased DeMattia cut growth resistance (rate),
(C) increased elongation at break, and
(D) increased energy to break.

It is also seen that the internal tread groove containing rubber block is not provided with a purpose of adding stiffness (e.g. Shore A hardness) to the tread (particularly the tread cap rubber layer) because it is normally desired to have a similar Shore A hardness as the tread cap rubber layer.

It is readily understood by those having skill in the art that the rubber compositions of the tread components would be compounded with conventional compounding ingredients including the aforesaid reinforcing fillers such as carbon black and precipitated silica, as hereinbefore defined, in combination with a silica coupling agent, as well as antidegradant(s), processing oil as hereinbefore defined, fatty acid comprised of, for example, stearic, oleic, palmitic, and possibly linolenic, acids, zinc oxide, sulfur-contributing material(s) and vulcanization accelerator(s) as hereinbefore mentioned.

Processing aids may be used, for example, waxes such as microcrystalline and paraffinic waxes, in a range, for example, of about 1 to 5 phr or about 1 to about 3 phr; and resins, usually as tackifiers, such as, for example, synthetic hydrocarbon and natural resins in a range of, for example, about 1 to 5 phr or about 1 to about 3 phr. A curative might be classified as sulfur together with one or more sulfur cure accelerator(s). In a sulfur and accelerator(s) curative, the amount of sulfur used may be, for example, from about 0.5 to about 5 phr, more usually in a range of about 0.5 to about 3 phr; and the accelerator(s), often of the sulfenamide type, is (are) used in a range of about 0.5 to about 5 phr, often in a range of about 1 to about 2 phr. The ingredients, including the elastomers but exclusive of sulfur and accelerator curatives, are normally first mixed together in a series of at least two sequential mixing stages, although sometimes one mixing stage might be used, to a temperature in a range of, for example, about 145° C. to about 185° C., and such mixing stages are typically referred to as non-productive mixing stages. Thereafter, the sulfur and accelerators, and possibly one or more retarders and possibly one or more antidegradants, are mixed therewith to a temperature of, for example, about 90° C. to about 120° C. and is typically referred as a productive mix stage. Such mixing procedure is well known to those having skill in such art.

After mixing, the compounded rubber can be fabricated such as, for example, by extrusion through a suitable die to form a tire tread. The tire tread is then typically built onto a sulfur curable tire carcass and the assembly thereof cured in a suitable mold under conditions of elevated temperature and pressure by methods well known to those having skill in such art.

The following Example is provided to further illustrate the invention. The parts and percentages are by weight unless otherwise indicated.

EXAMPLE

Rubber compositions were prepared to evaluate and compare rubber compositions for physical properties.

Rubber compositions are referred in this Example as rubber Samples A and B.

Rubber Sample A contains a combination of 20 phr of natural (cis 1,4-polyisoprene) rubber and 80 phr of cis 1,4-polybutadiene rubber with 20 phr of the natural rubber.

Rubber Sample B contains a combination of 50 phr of natural (cis 1,4-polyisoprene) rubber and 50 phr of cis 1,4-polybutadiene rubber with 50 phr of the natural rubber.

The basic rubber composition formulation is shown in Table 1 and the ingredients are expressed in parts by weight per 100 parts rubber (phr) unless otherwise indicated.

The rubber compositions may be prepared by mixing the elastomers(s) without sulfur and sulfur cure accelerators in a first non-productive mixing stage (NP-1) in an internal rubber mixer for about 4 minutes to a temperature of about 160° C. If desired, the rubber mixture may then mixed in a second non-productive mixing stage (NP-2) in an internal rubber mixer for about 4 minutes to a temperature of about 160° C. without adding additional ingredients. The resulting rubber mixture may then mixed in a productive mixing stage (PR) in an internal rubber mixer with sulfur and sulfur cure accelerator(s) for about 2 minutes to a temperature of about 110° C. The rubber composition may then sheeted out and cooled to below 50° C. between each of the non-productive mixing steps and prior to the productive mixing step. Such rubber mixing procedure is well known to those having skill in such art.

In the following Table 1, exemplary rubber compositions for a tread rubber cap layer (containing tread grooves) and tread groove encasement candidate (which includes a tread base rubber layer) are shown and reported as rubber Samples A and B.

TABLE 1

| Material | Rubber Sample A Tread Cap Example | Rubber Sample B Tread Groove Block candidate |
|---|---|---|
| Non-productive mixing | | |
| Natural rubber elastomer[1] | 20 | 50 |
| Cis 1,4-polybutadiene elastomer[2] | 0 | 50 |
| Cis 1,4-polybutadiene elastomer[3] | 80 | 0 |
| Carbon black[4], N121 | 47 | 0 |
| Carbon black[5], N550 | 0 | 30 |
| Silica[6] | 0 | 30 |
| Silica[7] | 10 | 0 |
| Silica coupler[8] | 2.5 | 0 |
| Silica coupler[9] | 0 | 5 |
| Oil[10] | 5 | 2 |
| Wax[11] | 1.5 | 1.5 |
| Antioxidants[12] | 4 | 6 |
| Resin[13] | 0 | 5 |
| Fatty acid | 2.5 | 1 |
| Zinc oxide | 3 | 3 |

TABLE 1-continued

| Material | Rubber Sample A Tread Cap Example | Rubber Sample B Tread Groove Block candidate |
|---|---|---|
| Productive mixing | | |
| Sulfur | 1.15 | 1.5 |
| Accelerator[14] | 1.37 | 1.45 |

[1]Natural rubber SMR-20 or SMR-5
[2]Cis 1,4-polybutadiene elastomer as Bud™ 1208 from The Goodyear Tire & Rubber Company
[3]Cis 1,4-polybutadiene elastomer as Bud™ 4001 from The Goodyear Tire & Rubber Company
[4]Carbon black N121(ASTM designation)
[5]Carbon black N550 (ASTM designation) carbon black having an Iodine number of about 43 with a DBP value of about 121.
[6]Precipitated silica as HI-SIL™ 210 KS300 from PPG Industries which is synthetic hydrated, amorphous, precipitated silica
[7]Precipitated silica as Zeosil 1165 from Rhodia
[8]Liquid coupling agent comprised of bis(3-triethoxysilylpropyl) polysulfide having an average of from about 3.4 to about 3.8 connecting sulfur atoms in its polysulfidic bridge as Si69™ from Evonic
[9]Coupling agent composite of carbon black (N330) and bis-(3-triethoxysilylpropyl) polysulfide having an average of from about 2.1 to about 2.6 connecting sulfur atoms in its polysulfidic bridge as Si266™ from Evonic in a 50-50 weight ratio
[10]Rubber processing oil
[11]A mixture of microcrystalline and paraffin waxes
[12]Amine based antioxidants
[13]Non-staining, unreactive phenol formaldehyde resin
[14]Sulfenamide based sulfur cure accelerator(s)

The prepared rubber compositions were cured at a temperature of about 170° C. for about 12 minutes for the tread block (tread groove containing rubber block) rubber composition and 150° C. for 32 minutes for the tread cap rubber composition and the resulting cured rubber samples evaluated for various physical properties which are reported in Table 2.

TABLE 2

| | Rubber Sample A Tread Cap Example | Rubber Sample B Tread Groove Block Candidate |
|---|---|---|
| ATS[1] | | |
| 100% modulus, MPa | 2.76 | 1.43 |
| 300% modulus, MPa | 12.4 | 6.64 |
| Tensile strength, MPa | 18.3 | 15.9 |
| Ultimate elongation (elongation at break) (%) | 453 | 609 |
| Energy, J (joules) to achieve break (at break) | 90 | 170 |
| Shore A hardness[2] | | |
| 23° C. | 71 | 63 |
| 100° C. | 61 | 57 |
| Zwick Rebound[3] | | |
| 23° C. | 44 | 44 |
| 100° C. | 54 | 53 |
| Tear strength (tear resistance), original, 95° C., N[4] | 141 | 238 |
| Mattia cut-growth rate at 95° C., min/mm | 16 | 284 |
| RPA505 Analytical Test Instrument | | |
| Uncured G' (0.83 Hz; 100° C.; 15% strain), MPa | 0.372 | 0.232 |
| T25, min | 1.98 | 1.9 |
| T90 min | 2.88 | 2.52 |
| Cured G' (1% strain; 100° C.; 1 Hz), MPa | 3 | 2.28 |
| Cured G' (10% strain; 100° C.; 1 Hz), MPa | 1.6 | 1.29 |
| Cured G' (50% strain; 100° C.; 1 Hz), MPa | 0.9 | 0.68 |

TABLE 2-continued

|  | Rubber Sample A Tread Cap Example | Rubber Sample B Tread Groove Block Candidate |
|---|---|---|
| Tan Delta (10% strain; 100° C.; 1 Hz) | 0.19 | 0.19 |
| ATS, Rubber Samples Aged 7 days at 70° C. | | |
| 100% modulus, MPa[1] | 3.91 | 2.27 |
| 300% modulus, MPa | 16 | 10.4 |
| Tensile strength, MPa | 18.2 | 16.2 |
| Ultimate elongation (elongation at break) (%) | 366 | 495 |
| Energy, J (joules) to achieve break (at break) | 81 | 129 |
| Shore A Hardness, aged[2] | | |
| 23° C. | 74 | 69 |
| 100° C. | 66 | 64 |
| Zwick Rebound, aged[3] | | |
| 23° C. | 46 | 49 |
| 100° C. | 57 | 58 |
| Tear strength, (tear resistance) aged, 95° C., N | 92 | 101 |

[1] Automated Testing System (ATS) instrument by the Instron Corporation which incorporates a plurality of tests in one system. Such instrument may determine properties such as ultimate tensile, ultimate elongation, modulii and energy to break data reported in the Table is generated by running the ring tensile test station which is an Instron 4201 load frame based on ASTM D412.
[2] ASTM D2240
[3] ASTM D1054
[4] Data obtained according to a peel strength adhesion (tear strength) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument.
[5] ASTM D813
[6] Data obtained according to DIN 53516 abrasion resistance test procedure using a Zwick drum abrasion unit, Model 6102 with 2.5 Newtons force. DIN standards are German test standards. The DIN abrasion results are reported as relative values to a control rubber composition used by the laboratory.

From Table 2 it can be seen that the energy to break increased from 90 to 170 joules for the tread groove encasement candidate as compared to the exemplary tread cap value which is indicative of a significant increase in the rubber composition's durability. This agrees with the indicated desirable physical properties and associated differences in physical properties found in Table A.

From Table 2 it can also be seen that the tear strength (resistance to tear) at (95° C.) increased from 141 to 238 for the tread groove encasement candidate as compared to the exemplary tread cap value which is also indicative of a significant increase in the rubber composition's durability. This agrees with the indicated desirable physical properties and associated differences in physical properties found in Table A.

In one sense, while the mechanism might not be entirely clear, it appears that contributing to the beneficial increases in predictive durability might be promoted, at least in part, by a significant increase in natural cis 1,4-polyisoprene content together with an optimized reinforcing filler and type, as well as an adjustment of the sulfur cure package in a sense of an increase in sulfur content and sulfur/accelerator ratio, to promote an increase in tear and cut growth resistance.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a circumferential tread of a cap/base construction comprised of an outer tread cap rubber layer containing a plurality of ribs containing tread running surfaces, with intervening grooves between the ribs, together with an underlying a tread base rubber layer;

wherein said tire tread further includes at least one groove containing rubber block which contains at least a portion of at least one of said tread grooves including the bottom of the at least one contained groove;

wherein said at least one circumferential groove containing rubber block joins the tire carcass and extends radially outward through said tread base rubber layer and into said tread cap rubber layer, and contains the bottom and at least a portion of the walls of at least one of said grooves where said at least one circumferential groove-containing rubber block extends within said outer tread cap rubber layer to include a portion of the outer tread running surface of at least one rib of said tread cap rubber layer;

wherein the rubber compositions of the tread cap rubber layer, tread base rubber layer and said at least one circumferential groove containing rubber block are comprised of individual sulfur cured diene elastomer-containing rubber compositions;

wherein the rubber composition of the said at least one circumferential groove-containing tread rubber block has a cut growth rate of at least 24 millimeters/minute less than the cut growth rate of the tread cap rubber layer according to ASTM test D813 at 23° C.

wherein:

(A) the rubber composition of said tread cap rubber layer has a DeMattia (95° C.) cut growth resistance value of equal or less than 20 min/mm and the rubber composition of said at least one circumferential groove containing rubber tread block has a value of equal to or greater than 30 min/mm, (B) the rubber composition for said tread cap rubber layer has an elongation break value of equal or less than 500 percent and the rubber composition of said at least one circumferential groove containing rubber tread block has an elongation break value equal to or greater than 600 percent, and (C) the rubber composition of said tread cap rubber layer has an energy to break value of equal or less than 100 joules and the rubber composition of said at least one circumferential groove containing tread rubber has an energy to break value of equal to or greater than 120 joules.

2. The tire of claim 1 wherein the rubber composition of said tread cap rubber layer is comprised of, based on parts by weight per 100 parts by weight rubber (phr):

(A) from 50 to about 90 phr of diene based elastomers comprised of cis 1,4-polyisoprene rubber and about 10 to about 50 phr of at least one of cis 1,4-polybutadiene rubber and styrene/butadiene rubber, or (B) from 50 to about 90 phr of diene based elastomers comprised of cis 1,4-polybutadiene rubber, and about 10 to about 50 phr of cis 1,4-polyisoprene rubber, where the rubber composition of said tread cap rubber layer contains:

(C) about 40 to about 120 phr of rubber reinforcing filler comprised of:

(1) rubber reinforcing carbon black, or (2) combination of rubber reinforcing carbon black and precipitated silica together with a silica coupler for said precipitated silica having a moiety reactive with hydroxyl groups contained on said precipitated silica and another different moiety interactive with said diene based elastomers, wherein the rubber composition of said tread base rubber layer and said at least one tread groove containing rubber block contain the same or different elastomers as the tread cap rubber composition and are comprised of:

(D) from 51 to about 90 phr of diene based elastomers comprised of cis 1,4-polyisoprene rubber and from about 10 to about 49, phr of at least one of cis 1,4-polybutadiene rubber and styrene/butadiene rubber, or (E) from 51 to about 90 phr of diene-based elastomers comprised of cis 1,4-polybutadiene rubber, and about 10 to about 49 phr of natural cis 1,4-polyisoprene rubber, (F) about 40 to about 100 phr of rubber reinforcing filler comprised of a combination of rubber reinforcing carbon black and precipitated silica together with a silica coupler for said precipitated silica having a moiety reactive with hydroxyl groups on said precipitated silica and another different moiety interactive with said diene based elastomers.

3. The tire of claim 2 wherein said cis 1,4-polybutadiene rubber has a microstructure comprised of from about 96 to about 99 percent cis 1,4-isomeric units, a number average molecular weight (Mn) in a range of from about 150,000 to about 300,000 and a heterogeneity index (Mw/Mn) in a range of from about 1.5/1 to about 2/1.

4. The tire of claim 2 wherein the rubber composition of said tread cap rubber layer is comprised of from 51 to about 90 phr of cis 1,4-polyisoprene rubber and about 10 to about 49 phr of at least one of cis 1,4-polybutadiene rubber and styrene/butadiene rubber.

5. The tire of claim 2 wherein the rubber composition of said tread cap rubber layer is comprised of from 51 to about 90 phr of cis 1,4-polybutadiene rubber, and about 10 to about 49 phr of cis 1,4-polyisoprene rubber.

6. The tire of claim 2 wherein said silica coupler is comprised of a bis(3-triethoxysilylpropyl) polysulfide containing an average in a range of from about 2 to about 3.8 connecting sulfur atoms in its polysulfidic bridge or an alkoxyorganomercaptosilane.

7. The tire of claim 6 where said bis(3-triethoxypropyl) polysulfide contains an average in a range of from about 2 to about 2.6 connecting sulfur atoms in its polysulfidic bridge.

* * * * *